United States Patent
Lu et al.

(10) Patent No.: US 11,905,829 B2
(45) Date of Patent: Feb. 20, 2024

(54) INTEGRATED LOGGING INSTRUMENT FOR CORING AND SAMPLING

(71) Applicants: China Oilfield Services Limited, Tianjin (CN); China National Offshore Oil Corporation, Beijing (CN)

(72) Inventors: Tao Lu, Hebei (CN); Yongren Feng, Hebei (CN); Changgui Xu, Hebei (CN); Zhibin Tian, Hebei (CN); Xiaofei Qin, Hebei (CN); Minggao Zhou, Hebei (CN); Xiaodong Chu, Hebei (CN); Tiemin Liu, Hebei (CN); Yongzeng Xue, Hebei (CN); Zanqing Wei, Hebei (CN); Lin Huang, Hebei (CN)

(73) Assignees: China Oilfield Services Limited, Tianjin (CN); China National Offshore Oil Corporation, Beijing (CN)

(*) Notice: Subject to any disclaimer, the term of this patent is extended or adjusted under 35 U.S.C. 154(b) by 253 days.

(21) Appl. No.: 17/420,108

(22) PCT Filed: May 14, 2020

(86) PCT No.: PCT/CN2020/090267
§ 371 (c)(1),
(2) Date: Jun. 30, 2021

(87) PCT Pub. No.: WO2021/135036
PCT Pub. Date: Jul. 8, 2021

(65) Prior Publication Data
US 2022/0316290 A1    Oct. 6, 2022

(30) Foreign Application Priority Data
Jan. 3, 2020 (CN) .......................... 202010005687.3

(51) Int. Cl.
*E21B 49/06* (2006.01)
*E21B 49/10* (2006.01)
*G01V 11/00* (2006.01)

(52) U.S. Cl.
CPC .............. *E21B 49/06* (2013.01); *E21B 49/10* (2013.01); *G01V 11/002* (2013.01)

(58) Field of Classification Search
CPC .......... E21B 49/06; E21B 49/08; E21B 49/02; E21B 49/081
See application file for complete search history.

(56) References Cited

U.S. PATENT DOCUMENTS

| | | | |
|---|---|---|---|
| 5,251,703 A | 10/1993 | Skinner | |
| 8,292,004 B2 * | 10/2012 | Buchanan | E21B 49/06 175/58 |

(Continued)

FOREIGN PATENT DOCUMENTS

| | | |
|---|---|---|
| CN | 2303080 Y | 1/1999 |
| CN | 1333459 A | 1/2002 |

(Continued)

OTHER PUBLICATIONS

Nov. 6, 2021—(CN) Second Office Action—App 202010005687.3.

(Continued)

*Primary Examiner* — Blake Michener
*Assistant Examiner* — Yanick A Akaragwe
(74) *Attorney, Agent, or Firm* — Banner & Witcoff, Ltd.

(57) ABSTRACT

An integrated logging instrument for coring and sampling includes a downhole main body and a ground system. The downhole main body is connected with the ground system through a long cable. The downhole main body includes a coring and sampling mechanism, a power mechanism and an energy storage mechanism. The coring and sampling mechanism includes a coring assembly for drilling cores and a (Continued)

pushing and setting assembly for downhole fixation. The power mechanism is arranged at an upper end of the coring and sampling mechanism, and includes a motor, a piston structure and a pump body. The piston structure and the pump body are respectively arranged at two output ends of the motor. The piston structure is arranged to provide suction power. The pump body is arranged to provide hydraulic power. The energy storage mechanism is arranged at a lower end of the coring and sampling mechanism.

20 Claims, 6 Drawing Sheets

(56) References Cited

U.S. PATENT DOCUMENTS

| | | | |
|---|---|---|---|
| 9,217,328 B2 * | 12/2015 | Yang | E21B 44/04 |
| 10,472,912 B2 * | 11/2019 | Haley | E21B 7/068 |
| 2006/0081398 A1 | 4/2006 | Arian et al. | |
| 2006/0131376 A1 * | 6/2006 | Bargach | G01N 1/12 |
| | | | 702/6 |
| 2007/0215349 A1 | 9/2007 | Reid et al. | |
| 2008/0078241 A1 | 4/2008 | Tchakarov | |
| 2008/0308279 A1 | 12/2008 | Zazovsky et al. | |
| 2009/0114447 A1 * | 5/2009 | Reid, Jr. | E21B 25/00 |
| | | | 175/58 |
| 2011/0242938 A1 | 10/2011 | Garcia-Osuna et al. | |
| 2014/0035588 A1 | 2/2014 | Botto | |

FOREIGN PATENT DOCUMENTS

| | | |
|---|---|---|
| CN | 2721876 Y | 8/2005 |
| CN | 1715614 A | 1/2006 |
| CN | 1721654 A | 1/2006 |
| CN | 1757881 A | 4/2006 |
| CN | 2881097 Y | 3/2007 |
| CN | 101037941 A | 9/2007 |
| CN | 101210492 A | 7/2008 |
| CN | 101253309 A | 8/2008 |
| CN | 101424170 A | 5/2009 |
| CN | 101864953 A | 10/2010 |
| CN | 102619503 A | 8/2012 |
| CN | 202370512 U | 8/2012 |
| CN | 202510116 U | 10/2012 |
| CN | 202596725 U | 12/2012 |
| CN | 104213898 A | 12/2014 |
| CN | 104234709 A | 12/2014 |
| CN | 204060683 U | 12/2014 |
| CN | 104329083 A | 2/2015 |
| CN | 104373120 A | 2/2015 |
| CN | 106567685 A | 4/2017 |
| CN | 107420099 A | 12/2017 |
| CN | 206987756 U | 2/2018 |
| CN | 207280806 U | 4/2018 |
| CN | 207436908 U | 6/2018 |
| CN | 108756874 A | 11/2018 |
| NO | 20073697 B | 9/2007 |
| WO | 2009014932 A2 | 1/2009 |

OTHER PUBLICATIONS

Apr. 21, 2021—(CN) First Office Action—App 201810596415.8.
Shiqin, Wang, "Analysis of Leaning-Against Method for Drilling Type Sidewall Coring Tool", DOI: 10. 168M /j-ciid. ssn1006-3242. Feb. 13, 1998, pp. 77-80.
Deshun, Liu, Yongping, Jin, Buyan, Wan, Peng, Youduo, and Xiaojun, Huang, "Review and Development Trends of Deep-sea Mineral Resource Core Sampling Technology and Equipment," China mechanical engineering vol. 25, No. 23 (2014), pp. 3255-3263.
Oct. 9, 2020—(CN) First Office Action—App 2020100056873— English Translation.

* cited by examiner

INTEGRATED LOGGING INSTRUMENT FOR CORING AND SAMPLING

CROSS-REFERENCE TO RELATED APPLICATIONS

The present application is a U.S. National Phase Entry of International PCT Application No. PCT/CN2020/090267 having an international filing date of May 14, 2020, which claims priority to Chinese Patent Application No. 202010005687.3 filed on Jan. 3, 2020. The present application claims priority and the benefit of the above-identified applications and the above-identified applications are incorporated by reference herein in their entirety.

TECHNICAL FIELD

The disclosure relates to, but is not limited to, the field of petroleum exploration and development, in particular to an integrated logging instrument for coring and sampling.

BACKGROUND

In order to master various information about a formation in detail, in the oil and gas exploration and development process in the United States and Russia, formation sampling and rock sampling are both necessary service items with broad market prospects. The comprehensive service fee for coring and sampling of a single well is up to nearly one million dollars, and the economic benefits are considerable.

At present, in the field of petroleum exploration and development, two types of equipments are used to obtain formation fluid samples and rock samples, respectively, and the operation must be carried out twice. The wellhead is occupied for a long time, the operation efficiency is low, and the operation cost is relatively high.

SUMMARY

The following is a summary of the subject matter described in detail in the present disclosure. This summary is not intended to limit the protection scope of the claims.

At least one embodiment of the present disclosure provides an integrated logging instrument for coring and sampling, which includes a downhole main body and a ground system. The downhole main body is connected with the ground system through a long cable. The downhole main body includes a coring and sampling mechanism, a power mechanism and an energy storage mechanism. The coring and sampling mechanism includes a coring assembly configured to drill a core and a pushing and setting assembly for downhole fixation. The power mechanism is arranged at an upper end of the coring and sampling mechanism, and includes a motor, a piston structure and a pump body. The piston structure and the pump body are respectively arranged at two output ends of the motor. The piston structure is configured to provide suction power for the pushing and setting assembly to extract formation fluid. The pump body is configured to provide hydraulic power for radial extension and retraction of a coring bit, a probe and a pushing arm of the coring and sampling mechanism. The energy storage mechanism is arranged at a lower end of the coring and sampling mechanism. The energy storage mechanism is configured to store pressure energy of the power mechanism, is able to serve as a temporary power source, and is configured to provide temporary power to the downhole main body to ensure safety of the downhole main body.

Other aspects will be understood after reading and understanding the drawings and detailed description.

Figure 1:
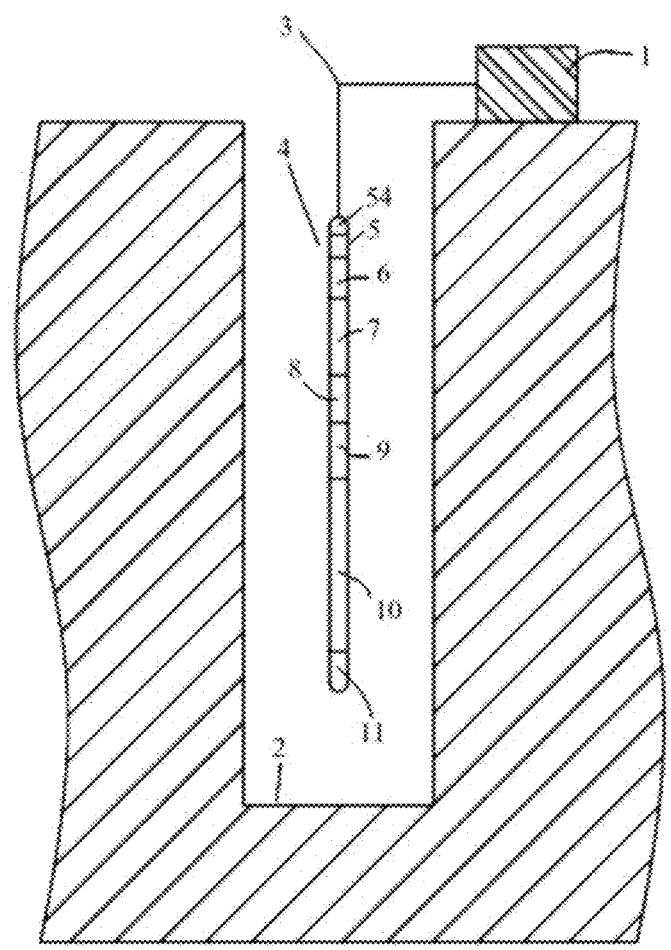
FIG. 1 is a schematic diagram of an integrated logging instrument for coring and sampling according to an embodiment of the present disclosure.

Reference signs: 1 ground system, 2 wellbore, 3 long cable, 4 downhole main body, 5 control mechanism, 6 outlet control assembly, 7 sampling barrel mechanism, 8 fluid identification mechanism, 9 power mechanism, 10 coring and sampling mechanism, 11 combination section, 12 pushing and setting assembly, 13 probe, 14 first pushing arm, 15 coring assembly, 16 coring bit, 17 second pushing arm, 18 piston structure, 19 motor, 20 pump body, 21 first chamber, 22 second chamber, 23 first piston, 24 second piston, 25 piston rod, 26 screw rod, 27 first output shaft, 28 second output shaft, 29 hydraulic chamber, 30 suction channel, 31 first fluid pipe, 32 second fluid pipe, 33 first branch pipe, 34 second branch pipe, 35 third branch pipe, 36 fourth branch pipe, 37 hydraulic pipe, 38 liquid outlet pipe, 39 liquid return pipe, 40 density sensor, 41 near infrared spectrum component analyzer, 42 fluorescence and reflection gas detection analyzer, 43 fluid resistivity analyzer, 44 sampling barrel, 45 energy storage mechanism, 46 balance compensator, 47 core storage barrel, 48 hydraulic branch pipe, 49 compression branch pipe, 50 first movable chamber, 51 second movable chamber, 52 third movable chamber, 53 fourth movable chamber, 54 tension measuring member.

DETAILED DESCRIPTION

Hereinafter, embodiments of the present disclosure will be described in detail with reference to the accompanying drawings. It should be noted that the embodiments in the present disclosure and the features in the embodiments can be arbitrarily combined with each other if there is no conflict.

In view of the defects of related logging instruments, an embodiment of the present disclosure provides an integrated logging instrument for coring and sampling, which can achieve the acquisition of formation fluid samples and rock samples. By adopting the integration technology, the length of the whole instrument is similar to or shorter than that of the current device for acquiring only formation fluid samples or only rock samples, thus the number of operations is reduced by one and the operation efficiency is greatly improved.

The following describes the integrated logging instrument for coring and sampling of the present disclosure with reference to embodiments.

As shown in FIGS. 1 to 5, the logging instrument includes a downhole main body 4 and a ground system 1. The ground system 1 is located on the ground, and the downhole main body 4 is lowered into a wellbore 2 and is electrically connected with the ground system 1 through a long cable 3. The downhole main body 4 is arranged along the wellbore 2, and includes a power mechanism 9, a coring and sampling mechanism 10 and a combination section 11 which are sequentially connected from top to bottom. The coring and sampling mechanism 10 includes a coring assembly 15 configured to drill a core and a pushing and setting assembly 12 for downhole fixation. The power mechanism 9 is arranged at an upper end of the coring and sampling mechanism 10, and includes a motor 19 as well as a piston structure 18 and a pump body 20 that are respectively arranged at two output ends of the motor 19. The piston structure 18 is configured to provide suction power for the pushing and setting assembly 12 to extract formation fluid, and the pump body 20 is configured to provide hydraulic power for extension and retraction of a coring bit 16, a probe 13 and a pushing arm of the coring and sampling mechanism 10 in a radial direction of the wellbore. The combination section 11 is arranged at a lower end of the coring and sampling mechanism 10. An energy storage mechanism 45 is arranged in the combination section 11, and can store pressure energy of the power mechanism 9 and serve as a temporary power source to provide temporary power for the downhole main body 4 when the instrument is damaged, thus ensuring the safety of the downhole main body 4. Therefore, the logging instrument can complete the acquisition of a formation fluid sample and a rock sample when it is lowered into the well once, which reduces the operation time and greatly improves the operation efficiency. Furthermore, the motor 19 drives the extraction of formation fluid and the extension and retraction of the coring bit 16, the probe 13 and the pushing arm, thus the hydraulic power structure of the original logging instrument is replaced, which may shorten a total length of the instrument and effectively improve the precision of coring and pushing.

The ground system 1 may demodulate, process, store and display data information uploaded by the downhole main body 4, deliver a control instruction, and modulate the delivered instruction, so that the ground system 1 may control posture and action of the downhole main body 4. In addition, the ground system 1 may also supply power to multiple motors in the downhole main body 4. The long cable 3 is a 7-kilometer long cable with seven cores, and the ground system 1 and the downhole main body 4 are connected by the long cable 3. The ground system 1 may transmit power to the downhole main body 4 and communicate with the downhole main body 4 through the long cable 3.

Further as shown in FIG. 1, the logging instrument further includes a control mechanism 5, and the control mechanism 5 is arranged at a top of the downhole main body 4 and is connected with the long cable 3 through a connector. The control mechanism 5 may modulate the data of the downhole main body 4, demodulate the instruction delivered by the ground system 1, and be responsible for data acquisition of the downhole main body 4.

Figure 3:
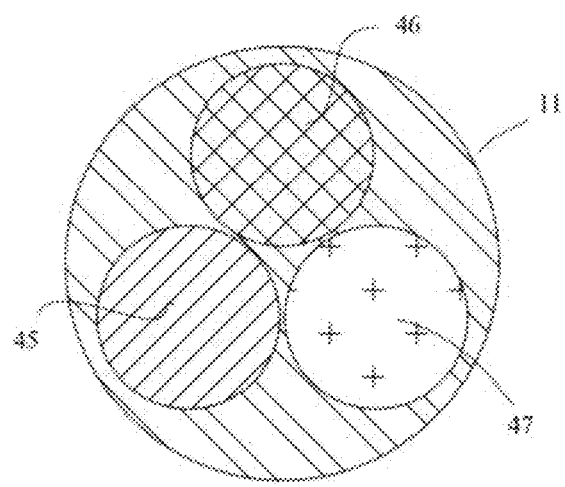
FIG. 3 is a schematic sectional view of a combination section in FIG. 1.

Upper and lower ends of the pushing and setting assembly 12 are respectively connected with the power mechanism 9 and the coring assembly 15, and the combination section 11 is installed at a lower end of the coring assembly 15. For the combination section 11, as shown in FIG. 3, the energy storage mechanism 45, a balance compensator 46 and a core storage barrel 47 are arranged in parallel in the combination section 11. Both the balance compensator 46 and the energy storage mechanism 45 are connected to oil paths, and the energy storage mechanism 45, the balance compensator 46 and the core storage barrel 47 are all arranged along a length of the wellbore 2. Compared with the existing instruments in which the energy storage mechanism 45 is arranged at an upper portion, the energy storage mechanism 45 is arranged in parallel with the core storage barrel 47 and the like and is located at the bottom in this example, which can further shorten the total length of logging instruments and save costs.

Figure 2:
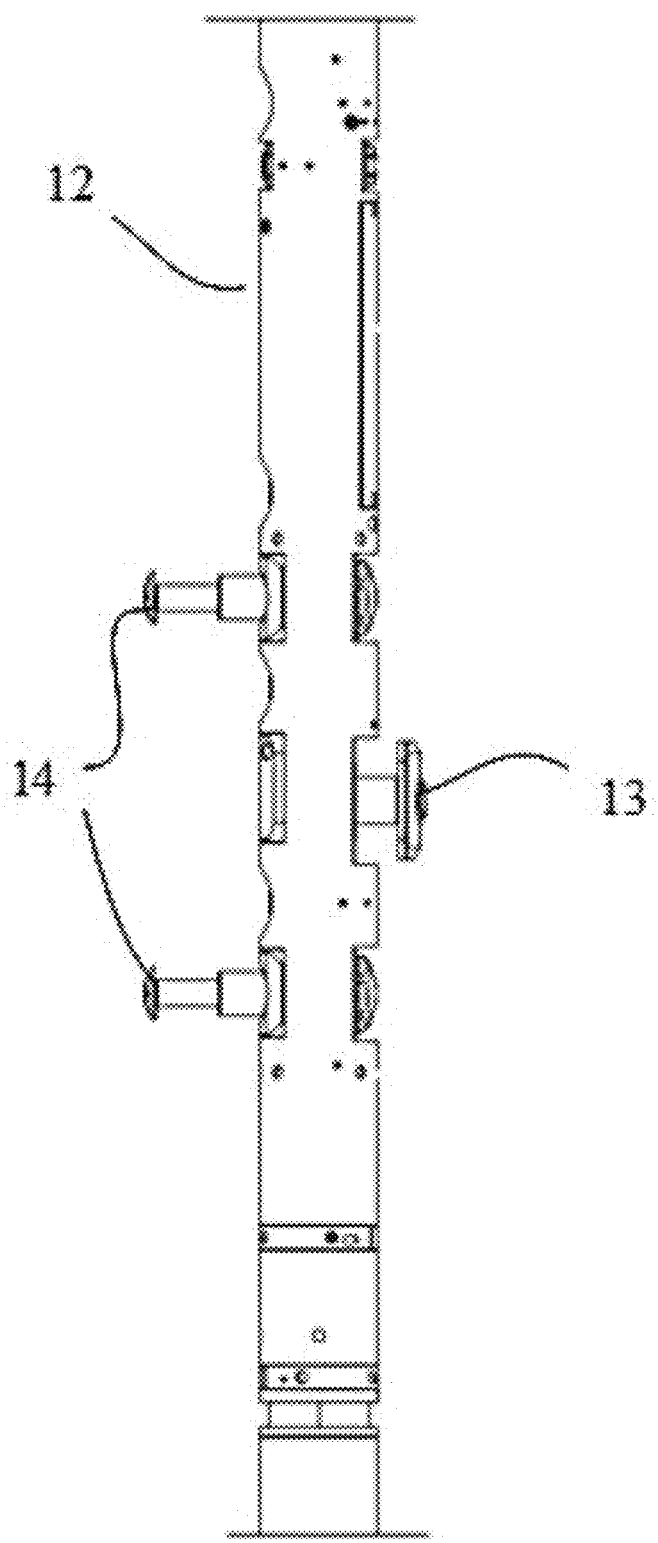
FIG. 2 is a schematic diagram of a pushing and setting assembly according to an embodiment of the present disclosure.
Figure 5:
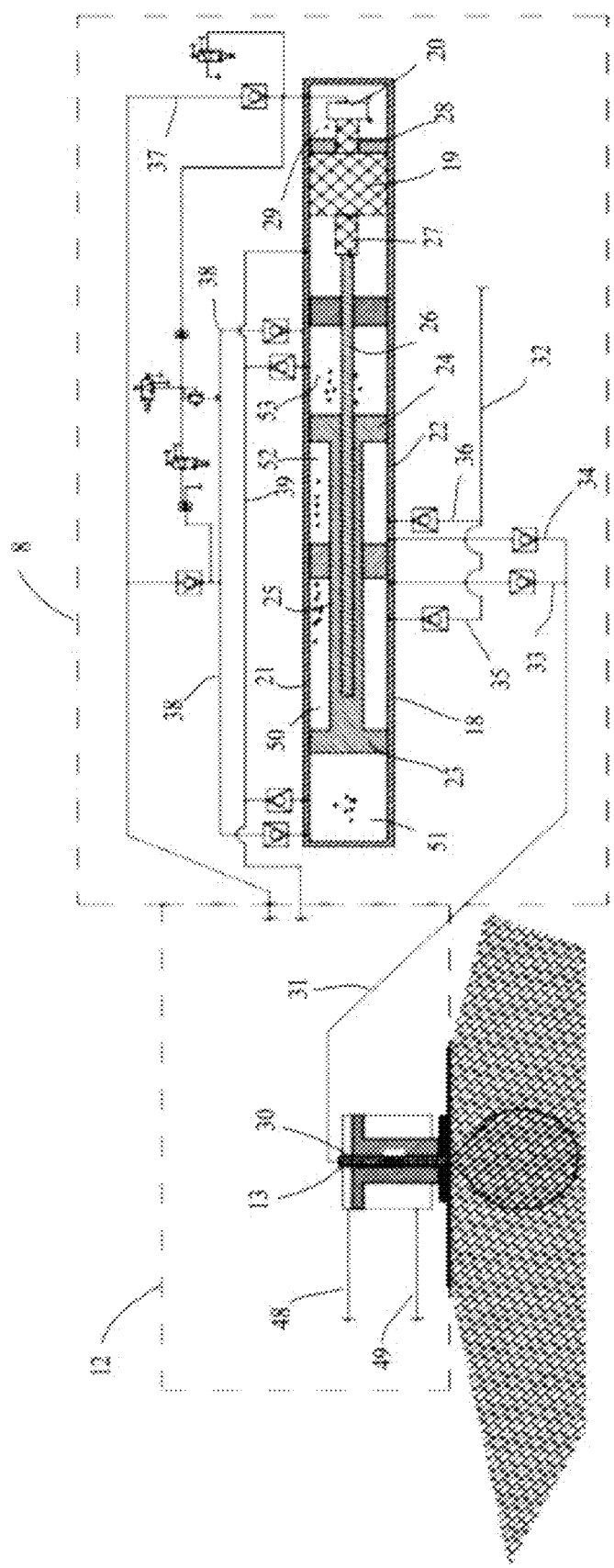
FIG. 5 is a schematic diagram of a power mechanism in FIG. 1.

As shown in FIG. 2 and FIG. 5, the pushing and setting assembly 12 is provided with telescopic first pushing arms 14 and a probe 13. The probe 13 and the a plurality of first pushing arms 14 may extend out of the downhole main body 4 under the action of respective corresponding hydraulic cylinders to abut against the well wall, so that the downhole main body 4 is fixed underground. At this time, the probe 13 is tightly pressed against the well wall to form a sealed suction channel 30, which is isolated from drilling mud liquid.

Figure 4:
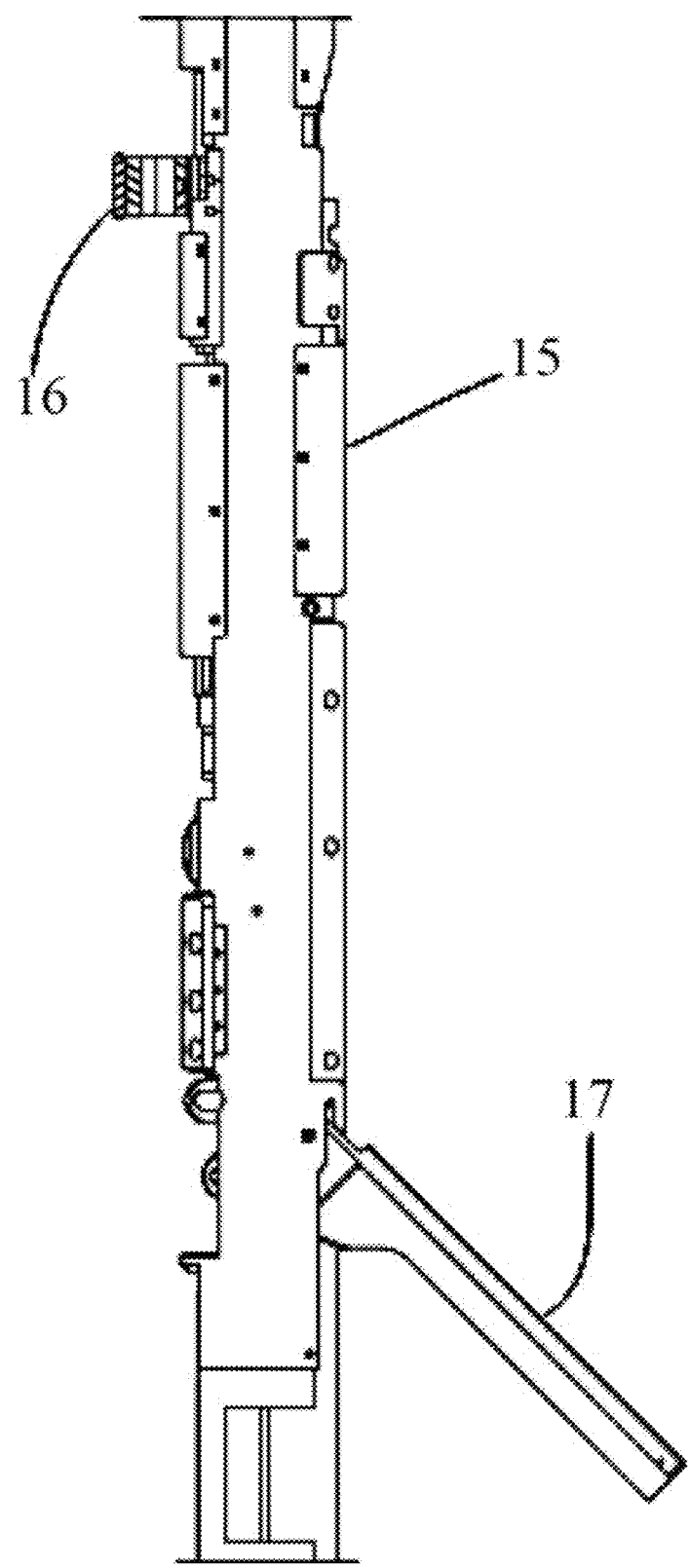
FIG. 4 is a schematic diagram of a coring assembly according to an embodiment of the present disclosure.

As shown in FIG. 4, the coring assembly 15 is provided with a telescopic coring bit 16 and a radially expandable second pushing arm 17 (i.e., the second pushing arm 17 is radially extendable). The coring bit 16 may rotate under the driving of a motor inside the coring assembly 15, and both the coring bit 16 and the second pushing arm 17 may extend and retract under the driving of respective corresponding hydraulic cylinders, so as to abut against and drill into the well wall. The coring assembly 15 can also realize the functions of breaking the core, pushing the core, identifying the core length, pushing the core to the core storage barrel and so on. In addition, a control structure in the coring assembly 15 may also receive the instructions delivered by the control mechanism 5 to accurately control the coring process of the coring assembly 15. The control structure may also collect state parameters of the coring assembly 15, such as hydraulic pressure, instrument posture, solenoid valve state, motor speed, temperature, etc., and upload these parameters to the control mechanism 5 through a data bus. Then these parameters continue to be fed back upward, so as to realize the data display on the ground.

Further as shown in FIG. 1, the downhole main body 4 further includes a sampling barrel mechanism 7, a fluid identification mechanism 8 and an outlet control assembly 6. The outlet control assembly 6, the sampling barrel mechanism 7 and the fluid identification mechanism 8 are sequentially arranged from top to bottom. The control mechanism 5 is arranged at an upper end of the outlet control assembly 6, and the power mechanism 9 is arranged at a lower end of the fluid identification mechanism 8. Therefore, under the action of the power mechanism 9, formation fluid may reach the sampling barrel mechanism 7 through the pushing and setting assembly 12, the power mechanism 9 and the fluid identification mechanism 8, or be discharged out of the downhole main body 4 through the outlet control assembly 6 and enter the wellbore. In this process, the real formation fluid is poured into the sampling barrel mechanism 7 for sealed storage, which is convenient for further chemical examination and analysis of the formation fluid. Moreover, the fluid identification mechanism 8 can identify a composition of the formation fluid, making full preparations for obtaining real formation fluid samples.

For the power mechanism 9, as shown in FIG. 5, the piston structure 18 of the power mechanism 9 includes an adapter, a first chamber 21 and a second chamber 22 separated from each other, and a first piston 23 arranged in the first chamber 21 and a second piston 24 arranged in the second chamber 22. The first chamber 21 and the second chamber 22 are separated and not communicated with each other. The first piston 23 and the second piston 24 are connected by a piston rod 25 and are respectively arranged at two ends of the piston rod 25, and the piston rod 25 passes through a partition separating the first chamber 21 and the second chamber 22. Therefore, the first piston 23 further divides the first chamber 21 into a first movable chamber 50 and a second movable chamber 51, and the second piston 24 further divides the second chamber 22 into a third movable chamber 52 and a fourth movable chamber 53. The adapter is a screw rod 26, and the piston rod 25 is provided therein with an internal thread matched with the screw rod 26, so that the screw rod 26 can drive the piston rod 25 to move along a length direction of the piston rod 25 when rotating. The motor 19 of the power mechanism 9 is a brushless DC motor, and two ends of the motor 19 are respectively provided with an output end, and the two output ends are respectively provided with a first output shaft 27 and a second output shaft 28. The first output shaft 27 is connected with the screw rod 26 so as to drive the screw rod 26 to rotate. The second output shaft 28 is connected with the pump body 20 of the power mechanism 9. The pump body 20 is a plunger pump, so that the pump body 20 may, when driven by the motor 19, draw normal-pressure liquid and output high-pressure liquid to the output side. In addition, the first output shaft 27 may further be connected with the screw rod 26 through a speed reducer to match a moving speed of the piston rod 25.

Figure 6:
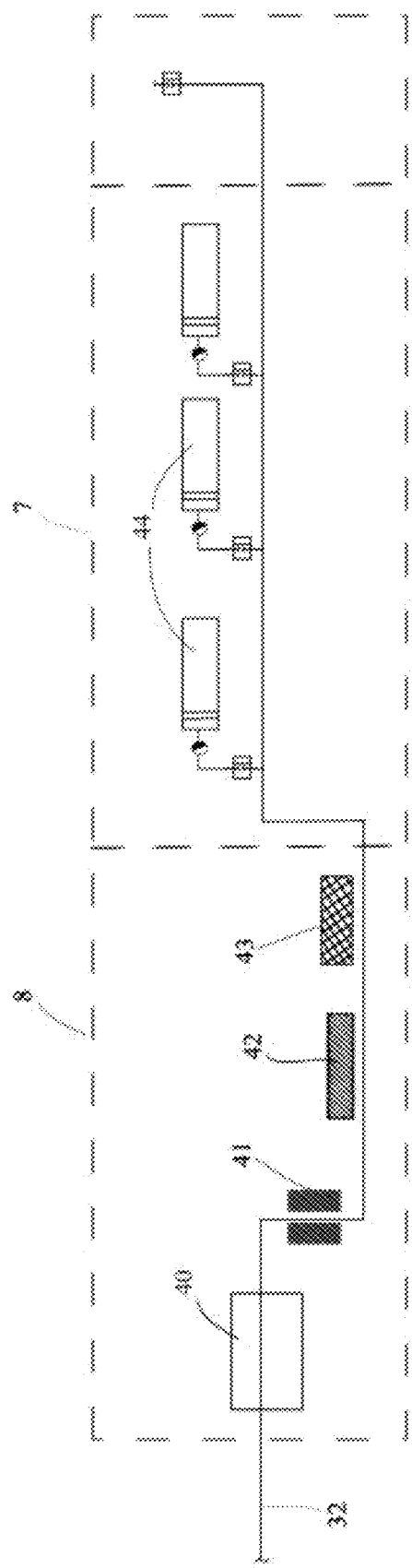
FIG. 6 is a schematic diagram of a fluid identification mechanism in FIG. 1.

Further as shown in FIGS. 5 and 6, the power mechanism 9 is provided with fluid pipes to respectively communicate with the suction channel 30 in the probe 13 and the sampling barrel 44 in the sampling barrel mechanism 7, and at the same time, the power mechanism 9 also transmits high-pressure liquid to the lower pushing and setting assembly 12 and the like through a hydraulic pipe 37. The fluid pipes include a first fluid pipe 31 and a second fluid pipe 32. One end of the first fluid pipe 31 is communicated with the suction channel 30, and the other end of the first fluid pipe is communicated with the first chamber 21 and the second chamber 22 respectively through a first branch pipe 33 and a second branch pipe 34. It is worth noting that the first branch pipe 33 is arranged at an end of the first chamber 21 close to the second chamber 22, that is, at the first movable chamber 50. The second branch pipe 34 is arranged at an end of the second chamber 22 close to the first chamber 21, that is, at the third movable chamber 52. Each of the first branch pipe 33 and the second branch pipe 34 is provided with a one-way valve, so that fluid can flow only into the first movable chamber 50 of the first chamber 21 and the third movable chamber 52 of the second chamber 22, but cannot flow out. Further, one end of the second fluid pipe 32 is communicated with the first chamber 21 and the second chamber 22 respectively through a third branch pipe 35 and a fourth branch pipe 36. The third branch pipe 35 is arranged at one end of the first chamber 21 close to the second chamber 22, that is, at the first movable chamber 50. The fourth branch pipe 36 is arranged at one end of the second chamber 22 close to the first chamber 21, that is, at the third movable chamber 52. Each of the third branch pipe 35 and the fourth branch pipe 36 is provided with a one-way valve, so that fluid can only flow out of the first chamber 21 and the second chamber 22, but cannot flow in. The other end of the second fluid pipe 32 is communicated with the sampling barrel 44. In addition, an end of the first chamber 21 away from the first branch pipe 33 (i.e., at the second movable chamber 51) and an end of the second chamber 22 away from the second branch pipe 34 (i.e., at the fourth movable chamber 53) are both connected to the hydraulic pipe 37 through the liquid outlet pipes 38 and are each provided with a one-way valve, so that the liquid in the second movable chamber 51 and the fourth movable chamber 53 may flow into the hydraulic pipe 37 under the action of pressure. At the same time, the second movable chamber 51 and the fourth movable chamber 53 are both communicated with an oil tank in the instrument through a liquid return pipe 39, so that the liquid may be refluxed and replenished into the second movable chamber 51 of the first chamber 21 and the fourth movable chamber 53 of the second chamber 22 under the action of pressure, thus realizing a recycling of liquid.

When the probe 13 has been set and the motor 19 rotates forward, the screw rod 26 starts to rotate, the motor 19 drives the piston rod 25 to move downward, and the first piston 23 and the second piston 24 will also move downward synchronously. At this time, the first movable chamber 50 is enlarged and the second movable chamber 51 is compressed, and the first chamber 21 forms negative pressure in a space of the first movable chamber 50, thus generating suction power. Therefore, formation fluid sequentially passes through the suction channel 30, the first fluid pipe 31 and the first branch pipe 33 of the first fluid pipe 31 and enters the first movable chamber 50. Until the piston rod 25 cannot move downward, the motor 19 automatically rotates backward, and the piston rod 25 moves upward to compress the first movable chamber 50, so that the formation fluid in the first movable chamber 50 is pressed into the third branch pipe 35, and flows to the sampling barrel 44 along the second fluid pipe 32, thereby realizing sampling. At the same time, the third movable chamber 52 is enlarged and the fourth movable chamber 53 is compressed, and negative pressure is also formed in the third movable chamber 52, which also generates suction power. The formation fluid sequentially passes through the suction channel 30, the first fluid pipe 31 and the second branch pipe 34 of the first fluid pipe 31 and enters the third movable chamber 52. When the motor 19 rotates forward again, the second piston 24 squeezes the formation fluid in the third movable chamber 52 to make it also flow to the sampling barrel 44. In this way, the motor 19 continuously rotates forward and backward, and the formation fluid may be continuously extracted. In addition, the second fluid pipe 32 reaches the sampling barrel mechanism 7 through the fluid identification mechanism 8. The fluid identification mechanism 8 includes a density sensor 40, a near infrared spectrum component analyzer 41, a fluorescence and reflection gas detection analyzer 42, and a fluid resistivity analyzer 43 which are sequentially arranged, and is able to comprehensively analyze the fluid composition and feed back detected data to the control mechanism 5. The sampling barrel mechanism 7 is provided with a maximum of 47 sampling barrels 44, and opening and closing of each sampling barrel 44 may be controlled by an electromagnetic valve on each sampling barrel 44. All of the sampling barrels 44 may be used for containing formation fluid. Furthermore, the outlet control assembly 6 at the upper end of the sampling barrel mechanism 7 may discharge redundant formation fluid out of the downhole main body 4. To sum up, as a power source, the motor 19 drives the formation fluid to be extracted, thus the suction is more accurate and reliable compared with the existing extraction processes.

As shown in FIG. 5, the power mechanism 9 transmits high-pressure liquid to the respective hydraulic cylinders of the coring bit 16, the probe 13 and the pushing arm through the hydraulic pipe 37, so that the coring bit 16, the probe 13 and the pushing arm radially extend. The power mechanism is provided with a hydraulic chamber 29, the hydraulic chamber 29 is filled with liquid. The pump body 20 in the hydraulic chamber 29 may transmit the formed high-pressure liquid to the probe 13 and the like through the hydraulic pipe 37, and the hydraulic pipe 37 is provided with an electromagnetic valve corresponding to the probe 13 and the like, which may control the transmission. Taking the probe 13 as an example, when the formation fluid needs to be extracted, the motor 19 is started, and the second output shaft 28 drives the pump body 20 to rotate so as to suck the liquid in the hydraulic chamber 29 to form high-pressure liquid, which is transmitted to the hydraulic cylinder of the probe 13, and the hydraulic cylinder will urge the probe 13 to extend out until it tightly abuts against the well wall to form a seal. In addition, the energy storage mechanism 45 may store the pressure energy generated by the power mechanism 9, and the balance compensator 46 may be communicated with the oil path to balance the oil path and the external pressure. The oil tank in the instrument may be configured to replenish liquid to the hydraulic chamber 29 through the liquid return pipe 39 to keep the hydraulic chamber in a fully filled state. The coring bit 16, the first pushing arm 14 and the second pushing arm 17 are also driven by the motor 19 like the probe 13 to realize radial extension. Therefore, as a power source, the motor 19 drives the coring bit 16, the first pushing arm 14 and the second pushing arm 17 to move, which is more accurate and reliable. Furthermore, because the motor 19 is used for driving, the liquid in the hydraulic chamber 29, the hydraulic pipe 37, the second movable chamber 51 and the fourth movable chamber 53 may be hydraulic oil, water or formation fluid. If water or formation fluid is used, use cost of the logging instrument may be further reduced.

Since the pushing and setting assembly 12 and the coring assembly 15 are integrated, the logging instrument can control fluid extracting and core drilling separately, and can further control the second pushing arm 17 and the coring bit 16 to retract, and control the first pushing arm 14 and the probe 13 to abut against the well wall, thereby realizing that the coring operation is switched to the sampling operation, or control the first pushing arm 14 and the probe 13 to retract and control the second pushing arm 17 to abut against the well wall and the coring bit 16 to drill in, thereby realizing that the sampling operation is switched to the coring operation. The second pushing arm 17 of the coring assembly 15 may also be used as a counter-pushing arm of the pushing and setting assembly 12. The first pushing arm 14 may also be used as a counter-pushing arm of the coring assembly 15. That is, counter-pushing actions are performed by the first pushing arm 14 and the second pushing arm 17, which may realize the self-stick-releasing operation during fixing and coring operations, and solve the problem that the instrument cannot be centered during the logging process, or the instrument is stuck by the close fit between the instrument and the formation under the action of formation pressure when the instrument stays close to the well wall for a long time. Therefore, the smoothness of the logging operation is adequately ensured and occurrence of instrument damage when the instrument is forcibly retracted is avoided.

When formation fluid is extracted, as shown in FIGS. 1, 4 and 5, the first pushing arm 14 and the probe 13 extend in opposite directions with an angle of 180 degrees formed therebetween, and the first pushing arm 14 pushes the downhole main body toward the opposite side. At this time, the probe 13 contacts the well wall and forms a setting. When the first pushing arm 14 and the probe 13 are retracted, if sticking occurs, the second pushing arm 17 of the coring assembly 15 may be extended to perform a counter-pushing action to release the sticking. Similarly, during a coring operation, the second pushing arm 17 is opposite to the coring bit 16. The second pushing arm 17 pushes the downhole main body toward the opposite side to abut it against the well wall, and then the coring bit 16 is extended to drill core. When the coring bit 16 and the second pushing arm 17 are retracted, if a sticking occurs during the retraction, the first pushing arm 14 of the pushing and setting assembly 12 may be extended to push the logging instrument in an opposite direction to release the sticking.

When an included angle between the extending directions of the second pushing arm 17 and the first pushing arm 14 is equal to 90 degrees, the first pushing arm 14, the probe 13, the second pushing arm 17 and the coring bit 16 are respectively arranged in four different horizontal directions at 90 degrees with respect to each other. When the formation fluid is extracted, sticking may occur on an extending side of the first pushing arm 14 or an extending side of the probe 13. At this time, the second pushing arm 17 may be extended, and under this action, the instrument may be separated from the well wall to achieve the purpose of releasing the sticking. During the coring operation, sticking easily occurs on a side of the coring bit 16, and either the first pushing arm 14 or the probe 13 may be used as a counter-pushing arm. In this case, the first pushing arm 14 may be extended (or the probe 13 may be extended or both the first pushing arm 14 and the probe 13 may be extended at the same time). Under this action, the instrument may be separated from the well wall, and then the whole may be moved to a central position of the borehole, so as to achieve the purpose of releasing the instrument from the sticking. In addition, an included angle between the extending directions of the second pushing arm 17 and the probe 13 ranges from 0 to 90 degrees, or the included angle between the extending directions of the second pushing arm 17 and the first pushing arm 14 ranges from 0 to 90 degrees, either of which may control the pushing and setting assembly 12 or the coring assembly 15 to perform a counter-pushing so as to release the sticking.

In addition, the downhole main body further includes a tension measuring member 54, the tension measuring member 54 is arranged at the top of the downhole main body and is configured to measure a tension of the downhole main body during the action thereof. The control mechanism 5 may determine an occurrence of sticking of the downhole main body according to a detection result of the tension measuring member 54, that is, when the downhole main body is lifted, if the tension is too large (exceeding a set value), it is determined that the logging instrument is stuck. Then a counter-pushing action is performed to realize the function of releasing the sticking. Therefore, the tension measuring member 54 may detect in time to determine the sticking and blocking of the logging instrument, thus avoiding the problem of damage caused by the forced drawing or direct movement of the instrument, and improving the safety and stability of the logging instrument in the downhole operation process. The first fluid pipe is further provided with a pressure measuring assembly which is a quartz pressure gauge and may measure a pressure of the obtained fluid sample. Moreover, the permeability of the formation may be calculated according to a volume of the formation fluid extracted by the first fluid pipe, the time for the formation fluid to penetrate from the formation into the first fluid pipe and achieve pressure stability, and the change of the formation pressure detected by the quartz pressure gauge, thus achieving the purpose of testing the formation pressure.

Therefore, the logging instrument can not only separately realize a coring or sampling operation, but also can complete continuous coring and sampling operations, thus fully reducing the number of downhole operations, speeding up the progress of continuous logging operations, reducing equipment energy consumption and cost in the continuous operation process, and improving logging efficiency.

In another example, the coring and sampling mechanism includes a plurality of coring assemblies and a plurality of pushing and setting assemblies, and the plurality of coring assemblies and the plurality of pushing and setting assemblies are alternately arranged, so that fluids at different depth positions may be simultaneously extracted, and cores at different depth positions may also be simultaneously drilled. Alternatively, the coring and sampling mechanism includes a plurality of pushing and setting assemblies and a coring assembly; the coring assembly is arranged at the bottom, the plurality of pushing and setting assemblies are sequentially arranged from top to bottom, and the first pushing arms of different pushing and setting assemblies extend out in different directions, so that the downhole main body is more stably fixed. Alternatively, the coring and sampling mechanism includes a plurality of coring assemblies and a pushing and setting assembly; the pushing and setting assembly is arranged at the top of the coring and sampling mechanism, and the plurality of coring assemblies are sequentially arranged from top to bottom, so that cores at different depth positions may be simultaneously drilled.

The above embodiments only describe several embodiments of the present disclosure, and the description thereof is relative specific and detailed, but the contents are only the embodiments adopted for the convenience of understanding the present disclosure, and are not intended to limit the present disclosure. Without departing from the spirit and scope of the present disclosure, any person skilled in the art to which the present disclosure pertains can make any modifications and changes in the implementation forms and details, but the protection scope of patent of the present disclosure shall still be subject to the definition of the appended claims.

What we claim is:

1. An integrated logging instrument for coring and sampling, comprising a downhole main body and a ground system, wherein the downhole main body is connected with the ground system through a long cable, the downhole main body comprises a coring and sampling mechanism, a power mechanism and an energy storage mechanism, the coring and sampling mechanism comprises a coring assembly for drilling a core and a pushing and setting assembly for downhole fixation; the power mechanism is arranged at an upper end of the coring and sampling mechanism and includes a motor, a piston structure and a pump body, the piston structure and the pump body are respectively arranged at two output ends of the motor, the piston structure is configured to provide suction power for the pushing and setting assembly to extract formation fluid, the pump body is configured to provide hydraulic power for radial extension and retraction of a coring bit, a probe and a pushing arm of the coring and sampling mechanism; the energy storage mechanism is arranged at a lower end of the coring and sampling mechanism, the energy storage mechanism is configured to store pressure energy of the power mechanism, and is able to serve as a temporary power source, the energy storage mechanism is configured to provide temporary power for the downhole main body to ensure safety of the downhole main body.

2. The integrated logging instrument for coring and sampling according to claim 1, wherein the lower end of the coring and sampling mechanism is further provided with a balance compensator and a core storage barrel, and the energy storage mechanism, the balance compensator and the core storage barrel are arranged in parallel along a length direction of a wellbore.

3. The integrated logging instrument for coring and sampling according to claim 2, wherein the pushing arm comprises a first pushing arm and a second pushing arm, the first pushing arm is arranged on the pushing and setting assembly and the second pushing arm is arranged on the coring assembly; an included angle between extending directions of the second pushing arm and the probe is set to be 0 to 90 degrees, or an included angle between extending directions of the first pushing arm and the second pushing arm is set to be 0 to 90 degrees.

4. The integrated logging instrument for coring and sampling according to claim 1, wherein the coring and sampling mechanism comprises a plurality of coring assemblies and a plurality of pushing and setting assemblies; or the coring and sampling mechanism comprises a plurality of the coring assemblies or a plurality of the pushing and setting assemblies.

5. The integrated logging instrument for coring and sampling according to claim 4, wherein the plurality of coring assemblies and the plurality of pushing and setting assemblies are alternately arranged.

6. The integrated logging instrument for coring and sampling according to claim 4, wherein the pushing arm comprises a first pushing arm and a second pushing arm, the first pushing arm is arranged on the pushing and setting assembly and the second pushing arm is arranged on the coring assembly; an included angle between extending directions of the second pushing arm and the probe is set to be 0 to 90 degrees, or an included angle between extending directions of the first pushing arm and the second pushing arm is set to be 0 to 90 degrees.

7. The integrated logging instrument for coring and sampling according to claim 1, wherein the piston structure comprises an adapter, a first chamber and a second chamber which are separated from each other, a first piston, and a second piston, the first piston is arranged in the first chamber, the second piston is arranged in the second chamber, the first piston and the second piston are connected and installed at an output end of the motor through the adapter, the motor is configured to operate in forward and backward rotations to drive the first piston and the second piston to make piston movement synchronously; the power mechanism is provided with a hydraulic chamber, the pump body is provided as a plunger pump and is arranged in the hydraulic chamber, and an output end of the pump body transmits a formed high-pressure liquid to the coring and sampling mechanism through a hydraulic pipe.

8. The integrated logging instrument for coring and sampling according to claim 7, wherein the downhole main body comprises a sampling barrel mechanism, the top of the coring and sampling mechanism is provided with the pushing and setting assembly, the sampling barrel mechanism is installed at an upper end of the power mechanism, and the sampling barrel mechanism is configured to store the extracted formation fluid.

9. The integrated logging instrument for coring and sampling according to claim 8, wherein the piston structure is communicated with a suction channel in the probe and sampling barrels in the sampling barrel mechanism through a first fluid pipe and a second fluid pipe respectively.

10. The integrated logging instrument for coring and sampling according to claim 9, wherein the first piston divides the first chamber into a first movable chamber and a second movable chamber, and the second piston divides the second chamber into a third movable chamber and a fourth movable chamber, the first movable chamber and the third movable chamber are arranged between the first piston and the second piston; one end of the first fluid pipe is arranged to be communicated with the suction channel, and the other end of the first fluid pipe is communicated with the first movable chamber and the third movable chamber through a first branch pipe and a second branch pipe respectively; one end of the second fluid pipe is communicated with the first movable chamber and the third movable chamber through a third branch pipe and a fourth branch pipe respectively, and the other end of the second fluid pipe is arranged to be communicated with the sampling barrel mechanism.

11. The integrated logging instrument for coring and sampling according to claim 10, wherein the pushing arm comprises a first pushing arm and a second pushing arm, the first pushing arm is arranged on the pushing and setting assembly and the second pushing arm is arranged on the coring assembly; an included angle between extending directions of the second pushing arm and the probe is set to be 0 to 90 degrees, or an included angle between extending directions of the first pushing arm and the second pushing arm is set to be 0 to 90 degrees.

12. The integrated logging instrument for coring and sampling according to claim 9, wherein the pushing arm comprises a first pushing arm and a second pushing arm, the first pushing arm is arranged on the pushing and setting assembly and the second pushing arm is arranged on the coring assembly; an included angle between extending directions of the second pushing arm and the probe is set to be 0 to 90 degrees, or an included angle between extending directions of the first pushing arm and the second pushing arm is set to be 0 to 90 degrees.

13. The integrated logging instrument for coring and sampling according to claim 8, wherein a fluid identification mechanism is arranged between the power mechanism and the sampling barrel mechanism.

14. The integrated logging instrument for coring and sampling according to claim 13, wherein the pushing arm comprises a first pushing arm and a second pushing arm, the first pushing arm is arranged on the pushing and setting assembly and the second pushing arm is arranged on the coring assembly; an included angle between extending directions of the second pushing arm and the probe is set to be 0 to 90 degrees, or an included angle between extending directions of the first pushing arm and the second pushing arm is set to be 0 to 90 degrees.

15. The integrated logging instrument for coring and sampling according to claim 8, wherein the downhole main body comprises a control mechanism which is arranged at an upper end of the sampling barrel mechanism and is configured to control the coring and sampling mechanism and the power mechanism to operate.

16. The integrated logging instrument for coring and sampling according to claim 8, wherein the pushing arm comprises a first pushing arm and a second pushing arm, the first pushing arm is arranged on the pushing and setting assembly and the second pushing arm is arranged on the coring assembly; an included angle between extending directions of the second pushing arm and the probe is set to be 0 to 90 degrees, or an included angle between extending directions of the first pushing arm and the second pushing arm is set to be 0 to 90 degrees.

17. The integrated logging instrument for coring and sampling according to claim 7, wherein the hydraulic chamber and the hydraulic pipe are filled with hydraulic oil, water or formation fluid.

18. The integrated logging instrument for coring and sampling according to claim 7, wherein the pushing arm comprises a first pushing arm and a second pushing arm, the first pushing arm is arranged on the pushing and setting assembly and the second pushing arm is arranged on the coring assembly; an included angle between extending directions of the second pushing arm and the probe is set to be 0 to 90 degrees, or an included angle between extending directions of the first pushing arm and the second pushing arm is set to be 0 to 90 degrees.

19. The integrated logging instrument for coring and sampling according to claim 1, wherein the pushing arm comprises a first pushing arm and a second pushing arm, the first pushing arm is arranged on the pushing and setting assembly and the second pushing arm is arranged on the coring assembly; an included angle between extending directions of the second pushing arm and the probe is set to be 0 to 90 degrees, or an included angle between extending directions of the first pushing arm and the second pushing arm is set to be 0 to 90 degrees.

20. The integrated logging instrument for coring and sampling according to claim 1, wherein the downhole main body comprises a tension measuring member arranged at a top of the downhole main body.

* * * * *